(12) United States Patent
von Beuningen et al.

(10) Patent No.: US 9,376,019 B2
(45) Date of Patent: Jun. 28, 2016

(54) METHOD FOR OPERATING A CONTROL DEVICE FOR A DISPLAY IN A MOTOR VEHICLE AND CORRESPONDINGLY FUNCTIONING CONTROL DEVICE

(71) Applicant: Bayerische Motoren Werke Aktiengesellschaft, Munich (DE)

(72) Inventors: Sven von Beuningen, Munich (DE); Daniel Lueken, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 29 days.

(21) Appl. No.: 14/194,240

(22) Filed: Feb. 28, 2014

(65) Prior Publication Data

US 2014/0247255 A1 Sep. 4, 2014

Related U.S. Application Data

(63) Continuation of application No. PCT/EP2012/066720, filed on Aug. 29, 2012.

(30) Foreign Application Priority Data

Aug. 31, 2011 (DE) .......................... 10 2011 081 901

(51) Int. Cl.
*B60K 35/00* (2006.01)
*G09G 5/14* (2006.01)

(52) U.S. Cl.
CPC *B60K 35/00* (2013.01); *G09G 5/14* (2013.01); *B60K 2350/1072* (2013.01); *B60K 2350/352* (2013.01); *G09G 2330/08* (2013.01); *G09G 2380/10* (2013.01)

(58) Field of Classification Search
CPC .......................................................... G09G 3/00
USPC ......................................... 345/156–184, 204
See application file for complete search history.

(56) References Cited

U.S. PATENT DOCUMENTS 7,430,473 B2 9/2008 Foo et al.
7,996,125 B2 8/2011 Skaff et al.
(Continued)

FOREIGN PATENT DOCUMENTS

CN 1760931 A 4/2006
CN 101031455 A 9/2007
(Continued)

OTHER PUBLICATIONS

International Search Report with English translation dated Dec. 12, 2012 (7 pages).

(Continued)

*Primary Examiner* — Carolyn R Edwards
(74) *Attorney, Agent, or Firm* — Crowell & Moring LLP

(57) ABSTRACT

A control device for a display is embodied for determining display data for at least one display element. The display is arranged in a vehicle and is embodied for visually signaling the specific display element as a function of the display data determined by the control device for that specific display element. A method for operating the control device includes the following steps: an estimated updating time period (t_est) for updating the display data for the display element is determined for the specific display element. The specific updating of the display data for the display element is controlled as a function of the estimated updating time period (t_est) and a pre-specified image rate.

10 Claims, 3 Drawing Sheets

(56) References Cited

U.S. PATENT DOCUMENTS

| | | |
|---|---|---|
| 8,004,395 B2 | 8/2011 | Okamoto et al. |
| 2010/0085370 A1 | 4/2010 | Usui |

FOREIGN PATENT DOCUMENTS

| | | |
|---|---|---|
| CN | 101722912 A | 6/2010 |
| DE | 198 59 430 A1 | 7/2000 |
| DE | 10 2006 022 851 A1 | 12/2007 |
| EP | 0 221 771 B1 | 1/1991 |
| EP | 0 928 254 B1 | 5/2002 |
| EP | 1 800 959 A1 | 6/2007 |
| EP | 2 213 518 A1 | 8/2010 |
| GB | 2 381 931 A | 5/2003 |
| JP | 2008-189211 * | 8/2008 |
| JP | 2008-189211 A | 8/2008 |
| WO | WO 00/38169 A1 | 6/2000 |

OTHER PUBLICATIONS

German Search Report with partial English translation dated Jul. 2, 2012 (10 pages).

International Preliminary Report on Patentability (PCT/IB/326 & PCT/IB/373) dated Mar. 13, 2014 (12 pages).

Chinese Office Action issued in Chinese counterpart application No. 201280049376.0 dated Sep. 28, 2015, with partial English translation (Thirteen (13) pages).

\* cited by examiner

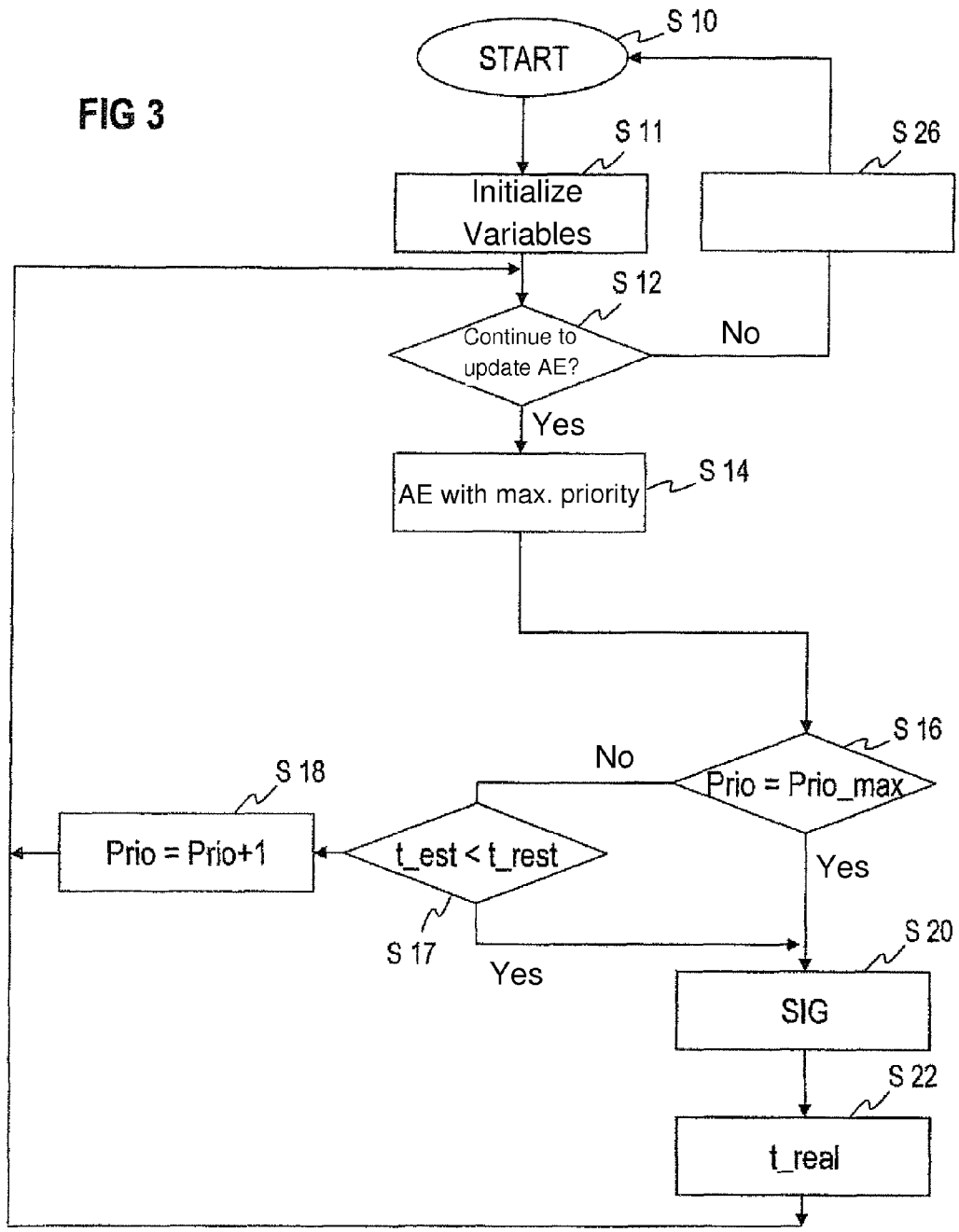

METHOD FOR OPERATING A CONTROL DEVICE FOR A DISPLAY IN A MOTOR VEHICLE AND CORRESPONDINGLY FUNCTIONING CONTROL DEVICE

CROSS REFERENCE TO RELATED APPLICATIONS

This application is a continuation of PCT International Application No. PCT/EP2012/066720, filed Aug. 29, 2012, which claims priority under 35 U.S.C. §119 from German Patent Application No. 10 2011 091 901.0, filed Aug. 31, 2011.

BACKGROUND AND SUMMARY OF THE INVENTION

The invention relates to a method for operating a control device for a display that is arranged in a motor vehicle. The invention furthermore relates to the control device for the display.

Today instrument cluster display devices for vehicles, especially motor vehicles, have a plurality of display instruments by means of which various vehicle-specific information may be displayed. These display instruments may include analog indicator devices, for instance round mechanical gauges. In modern motor vehicles, these analog indicator devices are increasingly being replaced by liquid crystal displays with indicator fields that visually signal a plurality of measured variables and/or warning signals. For better orientation of a motor vehicle user, some of the display fields are provided as virtual three-dimensional representations. However, this requires a great deal of computing power, in particular when the display fields are updated frequently because of measured variables that change rapidly.

The underlying object of the invention is to provide a method for operating a control device for a display of a motor vehicle and a control device for a display that make it possible for information, in particular vehicle-relevant information, to be displayed by the display promptly and/or in a time-relevant manner and that contribute to improving a quality of a representation of the information.

In accordance with a first aspect, the invention is distinguished by a method for operating a control device for a display that is arranged in a motor vehicle. The control device is embodied to determine display data for at least one display element. The display is embodied for visually signaling the specific display element as a function of the display data determined by the control device for that specific display element. The method includes the following steps: An estimated updating time period for updating the display data for the display element is determined for the specific display element and the specific updating of the display data for the display element is controlled as a function of the estimated updating time period and a pre-specified image rate.

The image rate denotes a number of individual images that are detected or determined in a certain time segment. A vertical frequency represents a number of individual images per second that are for instance displayed on the display. The image rate of the control device may be different from the vertical frequency of the display. The image rate and the vertical frequency are each preferably to be selected such that a continuous image impression may be imparted to the human eye for moved image content. Selecting the image rate as a whole-number factor of the vertical frequency that is smaller than or equal thereto has the advantage that uniform new images may be displayed. For instance, if the vertical frequency is 60 Hz and the image rate is 30 fps, each determined image is displayed twice. Adequate quality of a representation may be attained when the image rate is equal to or greater than the temporal resolution of the human eye. The pre-specified image rate that the control device should have is preferably matched to the vertical frequency of the display.

Advantageously controlling the updating of the display data of the display element as a function of the estimated updating time period makes it possible to keep a desired image rate of the control device approximately constant and thus to use available computing power of the control device in an optimal manner. In particular, it makes it possible not to fall below a desired image rate, or to fall below it in only a few exceptional cases, for instance when there is a fault. Falling below the pre-specified image rate may lead to a motor vehicle user not perceiving a continuous image impression when he looks at the display, but rather seeing so-called stutters. The display element may need to be updated due to changing vehicle data. These changes in the vehicle data may occur at any time. Determining the estimated updating time period makes it possible to decide whether or not it is still possible to perform an update of the display element during a current updating phase so that there is not a drop below the desired image rate. The updating phase may include a first time segment and a second time segment. During the first time segment of the updating phase, display data determined during a preceding updating phase for the specific display elements may be converted to a data format suitable for displaying on the display and written into a suitably embodied graphics memory. During a second time segment of the updating phase, the specific display elements may be updated.

The display element may extend for instance across a pre-specified display range of the display. The display element may be for instance a speedometer, a fuel gauge indicator, a tachometer and/or a model display of the motor vehicle.

A vertical frequency of the display may be pre-specified as constant or variable. During an update of the specific display element, the specific display data are re-determined and for instance stored in the suitably embodied graphics memory. The display data are for instance retrieved from the graphics memory and displayed by means of the display at a constant vertical frequency at regular time intervals. The display may be embodied for instance to display a pre-specified number of pixels. In this case the display data for the specific pixel of the display element include one or a plurality of pixel values.

The updating of the display data may include a plurality of determination steps. The updating of the display data may for instance include determining a display variable as a function of a detected measured variable and/or operating variable. In addition, the updating of the display data may include determining the specific pixel values for the display element. For instance, when there is a change in the motor vehicle speed, as a function of a currently determined motor vehicle speed an updated angular position of a speedometer needle may be determined and the pixels for the display element that includes the speedometer may be determined such that the display element represents on the display the speedometer with a speedometer needle that has the determined angular position.

The specific updating time period for updating the specific display data may vary. A time period for determining the display variable may vary as a function of the determined measured variable and/or operating variable. Furthermore, a temporal additional period for determining the pixels of the specific display element may be at least approximately constant or may vary. The display element may have representational elements that are to be represented and the number and/or size of which remains the same. In this case the additional period for determining the pixels may remain approximately constant. In a speedometer in which the angular position of the speedometer needle represents the vehicle speed, the number of representational elements stays the same, for instance. In a tachometer in which a number of virtual cubes represent the vehicle speed, in particular the number of representational elements to be represented varies, the time period for determining the pixels therefore varies, as a function of the vehicle speed.

In one advantageous embodiment, a remaining time period that is available for updating the display data of the specific display element as a function of the image rate is determined and the specific updating of the display data for the display element is controlled as a function of the remaining time period. The remaining time period may for instance be determined as a function of the duration of the first time segment and as a function of already determined updating time periods for the specific display elements that were already updated during the second time segment of the updating phase. A decision about whether another display element will be updated during the updating phase may be made as a function of the determined remaining time period and the estimated updating time period for the specific display element.

In another advantageous embodiment, the updating of the display data for the display element is controlled as a function of the detection of an updating requirement for the specific display element. This advantageously makes it possible for the updating of the specific display element to be controlled as needed.

In another advantageous embodiment, the specific display element is embodied for signaling a detected operating variable and/or additional information. The updating requirement is representative of a pre-specified deviation between a first value for the operating variable and a second value for the operating variable, which values are detected sequentially in time at a pre-specified time interval, or of a change in the additional information. The updating of the specific display element may thus be controlled as a function of a change in the information to be signaled.

In another advantageous embodiment, a priority is assigned to each display element. The updating of the display data for the display element is controlled as a function of a value that the priority of the specific display element has, wherein the value of the priority of the specific display element is adapted depending on whether the updating of the display data for the display element is performed during the remaining time period or not. This permits display elements that signal important information to make preferential updates when needed, but ensures that the updating of display elements that are assigned a lower priority is not neglected.

In another advantageous embodiment, the estimated updating time period for the specific display element is determined as a function of at least one updating time period detected during the updating of the display data for the display element. This permits the estimated updating time period to be determined in a simple manner.

In another advantageous embodiment, the estimated updating time period for the specific display element is determined as a function of a maximum updating time period that is determined from a pre-specified quantity of updating time periods detected for the display element.

In another advantageous embodiment, the updating time period is detected during the updating of the display data for the display element, and the quantity includes a pre-specified number of the most recently detected updating time periods.

Thus the updating time periods for the specific display elements may advantageously be monitored, for instance to detect faults. Furthermore, the estimated updating time period may be determined in a simple manner as a function of the most recently detected updating time periods.

In another advantageous embodiment, the estimated updating time period is determined as a function of the detected operating variable and/or the additional information that is signaled by the display element. The display element may have representational elements whose number and/or size is a function of the operating variable to be signaled and/or additional information. Depending on the detected operating variable and/or the additional information, a variable portion of the estimated updating time period may for instance be determined and the estimated updating time may be determined in a simple and reliable manner.

In accordance with a second aspect, the invention is distinguished by a control device for a display that is arranged in a vehicle. The control device is embodied to determine display data for at least one display element. The display is embodied for visually signaling the specific display element as a function of the display data determined by the control device for that specific display element. The control device is furthermore embodied for determining an estimated updating time period for the specific display element for updating the display data of the display element. The control device is furthermore embodied for controlling the specific updating of the display data for the display element as a function of the estimated updating time period and a pre-specified image rate. Advantageous embodiments of the first aspect of the invention also apply to the second aspect.

BRIEF DESCRIPTION OF THE DRAWINGS

Exemplary embodiments of the invention shall be explained using the following figures.

Elements having the same design or function are provided the same reference numbers in all of the figures.

DETAILED DESCRIPTION OF THE DRAWINGS

Figure 1:
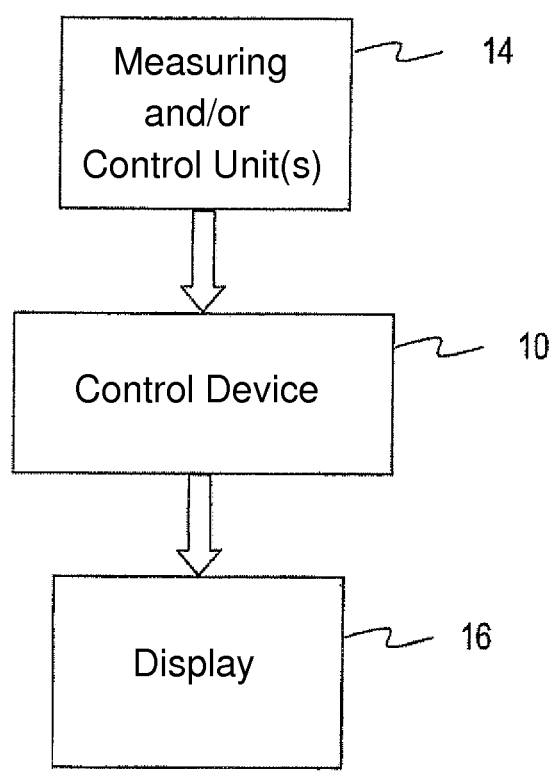
FIG. 1 is a block diagram having a control device for a display of a motor vehicle.

FIG. 1 depicts as an example a block diagram having a control device 10 for operating a display 16 of a vehicle. The control device 10 and the display 16 are for instance arranged in a motor vehicle. Alternatively or in addition, the control device 10 and the display 16 may be arranged for instance in an aircraft, ship, and/or train and/or in a monitoring station for monitoring the aircraft. The control device 10 is electrically coupled to the display 16. The control device 10 includes for instance a computing unit and a program memory in which a first program and/or a second program are stored. The first program shall be explained using FIG. 2 and the second program using FIG. 3. The control device 10 depicted in FIG. 1 is embodied for executing the first and/or the second program.

The control device 10 is coupled for instance with one or a plurality of measuring and/or control units 14 of the vehicle that are embodied for instance for detecting one or a plurality of operating variables of the vehicle. Each specific operating variable may include a measured variable or a status variable and/or another variable derived from measured variables and/ or status variables. Each specific operating variable may characterize an operating status, a driving status and/or an environmental condition of the vehicle.

The display 16 is embodied for instance as a liquid crystal screen. Alternatively or in addition, the display 16 may include for instance an OLED display (organic light emitting diode) and/or a projection display. The display 16 has for instance a pre-specified number of pixels. The display 16 is arranged for instance in an instrument panel of the vehicle and is used for instance as an instrument cluster.

Figure 2:
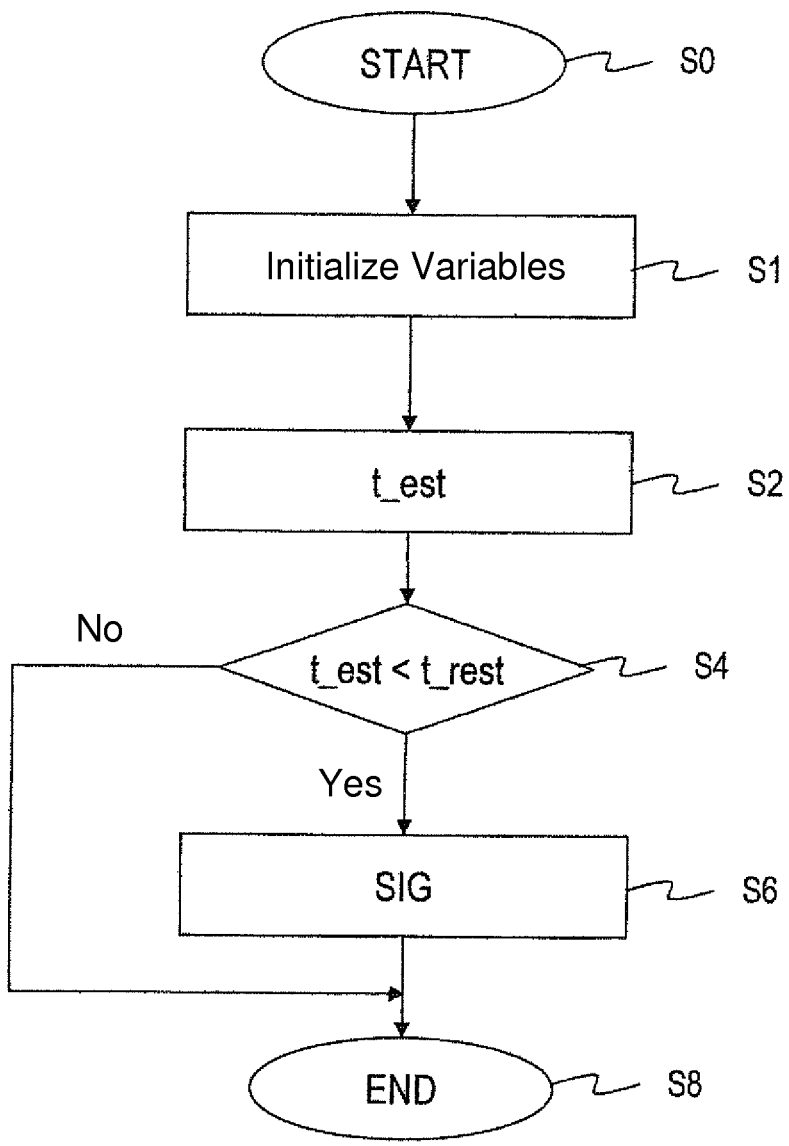
FIG. 2 is a flow chart for a first program for operating the control device of the display; and, FIG. 3 is a flow chart for a second program for operating the control device of the display.

The control device 10 is embodied for determining display data for at least one display element AE and the display 16 is embodied for visually signaling the specific display element AE as a function of the display data determined by the control device 10 for that specific display element AE. Referring to FIG. 2, the specific display element AE may be for instance a speedometer, a fuel gauge indicator, a temperature indicator, a tachometer, and/or a warning signal display.

The first program controls an updating of the display data of the specific display element AE. The first program is started in a step S0. The first program preferably starts with the control device 10 in an active operating status.

In a step S1, for instance, variables, for instance counters, may be initialized.

In a step S2, an estimated updating time period t_est for an updating of the display data is determined for the specific display element AE. The estimated updating time period t_est for the display element AE may be determined for instance as a function of at least one updating time period t_real determined during a previous updating of the display data for the display element AE. For instance, the estimated updating time period t_est may be determined as a function of a maximum updating time period that is determined from a pre-specified quantity of updating time periods t_real detected for the display element AE. To this end for instance the updating time period t_real may be detected during the updating of the display data for the display element AE.

The quantity may include for instance a pre-specified number of the most recently detected updating time periods t_real. For instance, the estimated updating time period t_est may be determined as a function of the maximum updating time period from the quantity of the last ten detected updating time periods t_real. For instance the estimated updating time period t_est may represent this maximum updating time period.

Alternatively or in addition, it is possible for the estimated updating time period t_est to be determined as a function of the detected operating variable and/or the additional information that is signaled by the display element AE. The display element AE may have representational elements whose number and/or complexity is a function of the operating variable to be signaled and/or of the additional information. For instance, depending on the updating time periods t_real detected for this display element AE, a scaling factor may be determined for a variable portion of the specific detected updating time periods t_real and the estimated updating time period t_est may be determined as a function of the scaling factor and the operating variable to be signaled and/or on additional information. This may advantageously be used for instance for a text display.

In a step S4 there is a query to determine whether sufficient time is available for the updating of the specific display element AE. The check of whether sufficient time is available for the updating of the specific display element AE is made as a function of the specific estimated updating time period t_est and a pre-specified image rate. The vertical frequency of the display 16 may be specified as fixed, for instance 60 Hz. In this case the image rate may advantageously be pre-specified as 30 Hz or 60 Hz. Alternatively, it may be provided that the vertical frequency of the display 16 may be pre-specified as variable.

For instance, a remaining time period t_rest may be determined as a function of the image rate and for instance a first time segment. The first time segment may for instance represent a calculation time that is needed to convert the display data to a data format that is suitable for displaying on the display, and/or may represent a storage time that is required for storing in a graphics memory the display data that were determined during an immediately preceding updating phase for the specific display element AE. Furthermore, the remaining time period t_rest may be determined as a function of updates already performed during the current updating phase. In addition, the specific updating time periods t_real for instance for the display elements AE may be detected.

If the test in step S4 indicates that the estimated updating time period t_est for the specific display element AE is less than the remaining time period t_rest, a control signal SIG is produced for instance in a step S6 and, depending on the control signal, the control device 10 performs the updating of the display data for the display element AE.

For instance, it may be provided that for an updating phase a quantity of display elements AE for which a test is performed to determine whether an update is temporally possible is pre-specified, and if so, the update is performed. In addition, the first program may be continued by means of a performance statement in the step S2. The quantity of display elements AE may be pre-specified differently for the specific updating phase. If an updating of all display elements AE of the pre-specified quantity is checked and performed where necessary, the program may be terminated in a step S8 or may be continued in the step S1 for a new updating phase.

For instance, it may be provided that the updating of the specific display elements AE is controlled as a function of an updating requirement and/or a priority of the display elements AE. The second program for operating the control device 10 may be used for this, for instance.

FIG. 3 illustrates the flow chart for the second program. The second program is started in a step S10. The second program preferably starts with the control device 10 in an active operating status. The second program is executed for instance while the control device 10 is in an active operating mode.

In a step S11, for instance, variables, such as counters, may be initialized.

In a step S12, there is for instance a check to determine whether there is an updating requirement for additional display elements AE. The updating requirement may be representative for a pre-specified deviation between a first value and a second value for the operating variable to be signaled, which values are detected sequentially in time at a pre-specified time interval, or for a change in the additional information to be signaled.

If there are no updating requirements for any other display elements AE, the program pauses, for instance in a wait loop S26, until the control device 10 has stored the display data of the updated display elements AE in the graphics memory. Then, the program is continued in step S12.

If the test in step 12 indicates that there is an updating requirement for additional display elements AE, in step S14 the display element AE that currently has the highest priority value is selected from this quantity of display elements AE.

In a step S16 there is a check to determine for instance whether the value of the priority of this display element AE is equal to a prior highest value. If the value of the priority is equal to the highest value, in step S20 for instance the control signal SIG is generated and, depending on the control signal, the control device 10 performs the updating of the display data for the display element AE.

In a step S22, the updating time period t_real is detected for instance during the updating of the display element AE. Proceeding from step S22, the program continues to step S12.

If it is detected in step S16 that the value of the priority is less than the highest value, then in step S17 the estimated updating time period t_est for the display element AE is determined and checked to see if enough time is available for updating the specific display element AE. Step S17 corresponds to steps S2 and S4 in the first program.

If the check in step S17 determines that the estimated updating time period t_est is less than the remaining time period t_rest, the program is continued in step S20.

If the check in step 17 determines that the estimated updating time period t_est is greater than the remaining time period t_rest, in a step S18 the value of the priority of the display element AE is increased in a pre-specified manner, for instance by the value 1. Proceeding from step S18, the program continues to step S12.

In the second program, the estimated updating time period t_est is used to decide whether or not an updating of the specific display element AE for which there is already an updating requirement will be performed. If the updating of the display element AE is not performed, the value of the priority of the display element AE is increased. This means that during the next updating phase the display element AE will have preferential treatment. If the time available during the next updating phase is still not sufficient, the value of the priority for the display element AE continues to be increased until the value of the priority has reached the pre-specified highest value. If the priority has the highest value, the updating of this display element AE is performed regardless of the estimated updating time period t_est for this display element AE. This makes it possible for information, especially vehicle-relevant information, to be displayed by the display promptly and/or in a time-relevant manner and at the same time permits high-quality representation of the information.

REFERENCE LIST

10 Control device
14 Measuring and/or control device
16 Display
AE Display element
S0 . . . S26 Program steps
SIG Signal
t_est Estimated updating time period
t_real Detected updating time period
t_rest Remaining time period

The invention claimed is:

1. A method for operating a control device for a display arranged in a vehicle, the control device being embodied to determine display data for at least one display element, and the display being embodied to visually signal a specific display element as a function of the determined display data for the specific display element, the method comprising the acts of:
for a specific display element, determining an estimated updating time period for updating the specific display element;
determining a remaining time period available for updating the display data of the specific display element as a function of the pre-specified image rate; and
controlling the updating of the display data for the specific display element as a function of each of the estimated updating time period, the remaining time period, and a pre-specified image rate.

2. The method according to claim 1, wherein the updating of the display data for the specific display element is controlled as a function of a detection of an updating requirement for the specific display elements.

3. The method according to claim 2, wherein
the specific display element is embodied to signal a detected operating variable and/or additional information,
the updating requirement is representative of:
(i) a pre-specified deviation between a first value and a second value for the operating variable, the first value and the second value being detected sequentially in time at a pre-specified time interval, or
(ii) a change in the additional information.

4. The method according to claim 1, wherein
a priority is assigned to each specific display element, and
the updating of the display data for the display element is controlled as a function of a value that the priority of the specific display element has, wherein the value of the priority of the specific display element is adapted depending on whether or not the updating of the display data for the display element is performed during the remaining time period.

5. The method according to claim 4, wherein
the estimated updating time period for the specific display element is determined as a function of at least one updating time period that is detected during updating of the display data for the display element.

6. The method according to claim 1, wherein
the estimated updating time period for the specific display element is determined as a function of at least one updating time period that is detected during updating of the display data for the display element.

7. The method according to claim 5, wherein
the estimated updating time period for the specific display element is determined as a function of a maximum updating time period that is determined from a pre-specified quantity of updating time periods that are detected for the display element.

8. The method according to claim 7, wherein
the updating time period is detected during the updating of the display data for the display element, and
the pre-specified quantity of updating time periods includes a pre-specified number of the most recently detected updating time periods.

9. The method according to claim 1, wherein
the estimated updating time period is determined as a function of a detected operating variable and/or additional information signaled by the display element.

10. A control device for a display arranged in a vehicle, comprising:
a processor and associated memory in which a computer program is stored, the processor executing the stored program to:
determine display data for at least one display element to be displayed on the display,
determine an estimated updating time period for a specific display element for updating the display data,
determine a remaining time period available for updating the display data of the specific display element as a function of the pre-specified image rate; and
control the updating of the display data for the specific display element as a function of each of the determined estimated updating time period, the determined remaining time period, and a pre-specified image rate.

\* \* \* \* \*